INVENTORS
Rea I. Hahn and Bernard E. Frank
BY
their attorneys

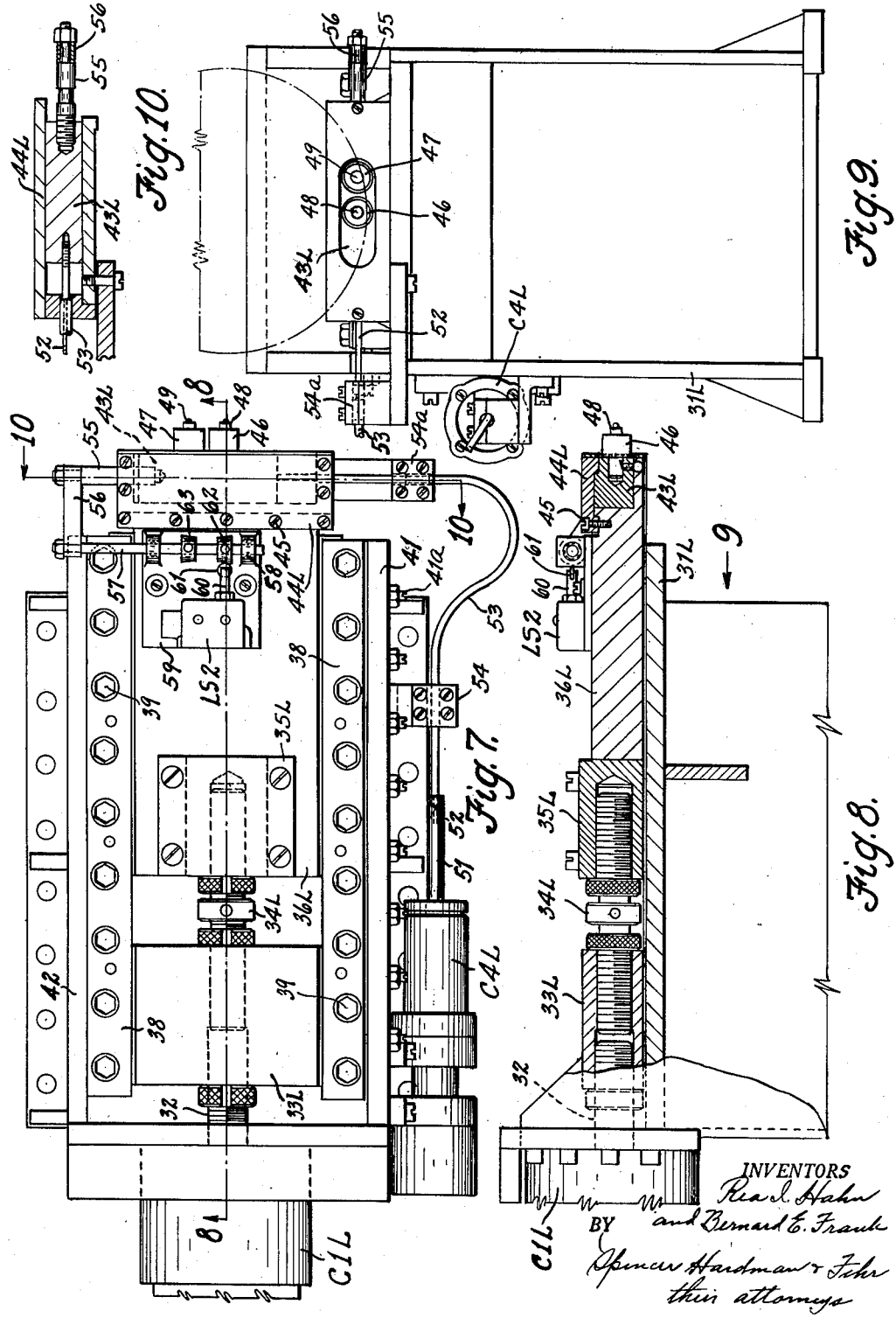

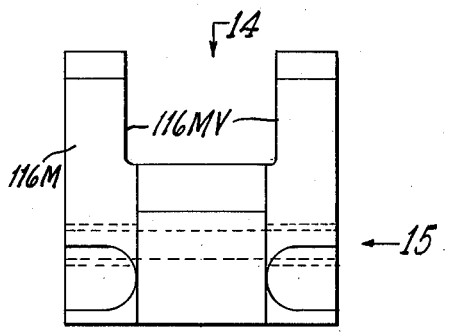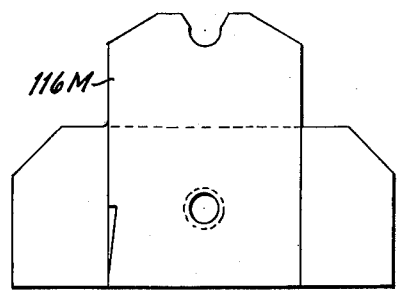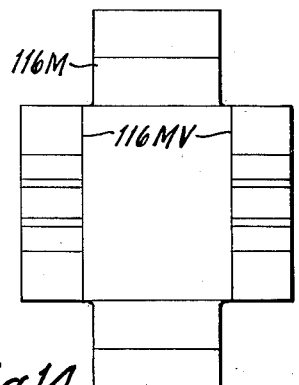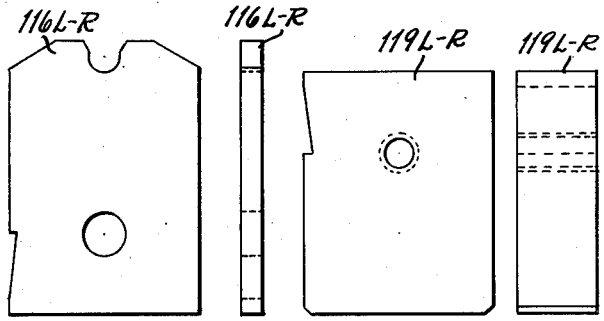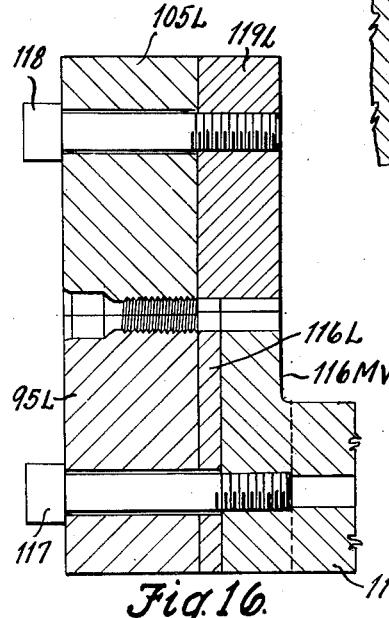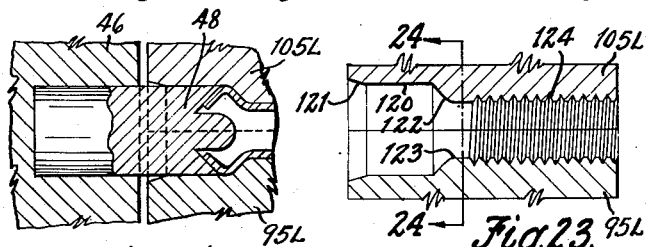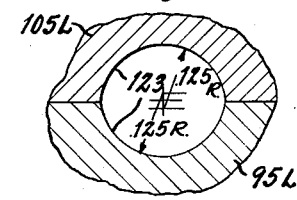

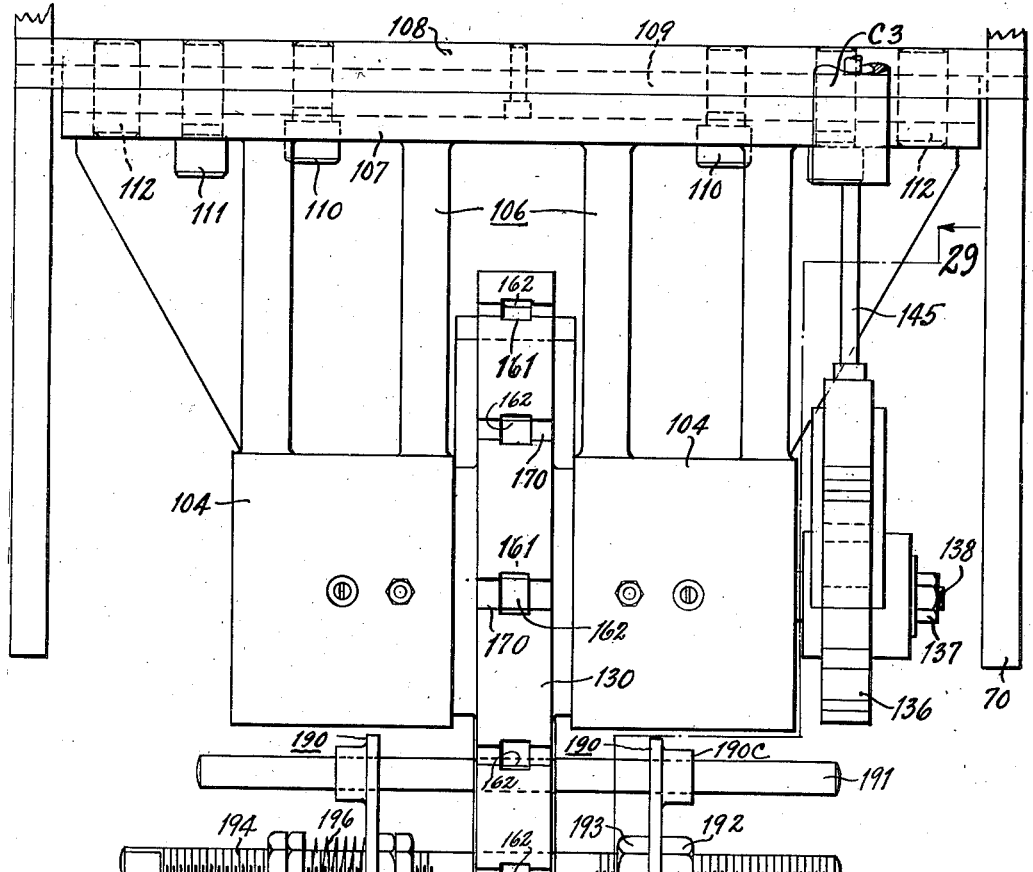
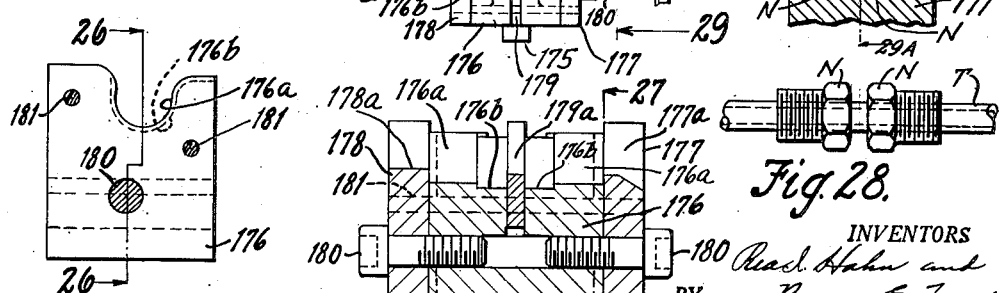

Oct. 2, 1951 R. I. HAHN ET AL 2,569,523
TUBE FLARING MACHINE
Filed Jan. 21, 1949 13 Sheets-Sheet 11
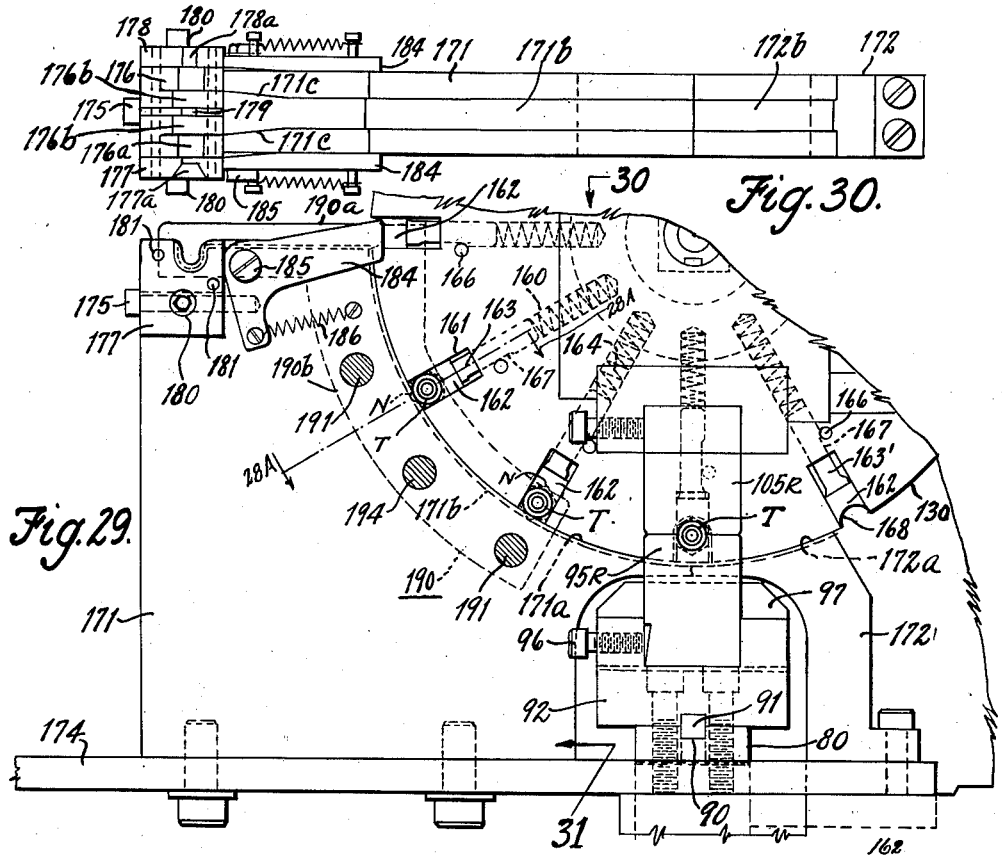
Fig. 30.
Fig. 29.
Fig. 29A.
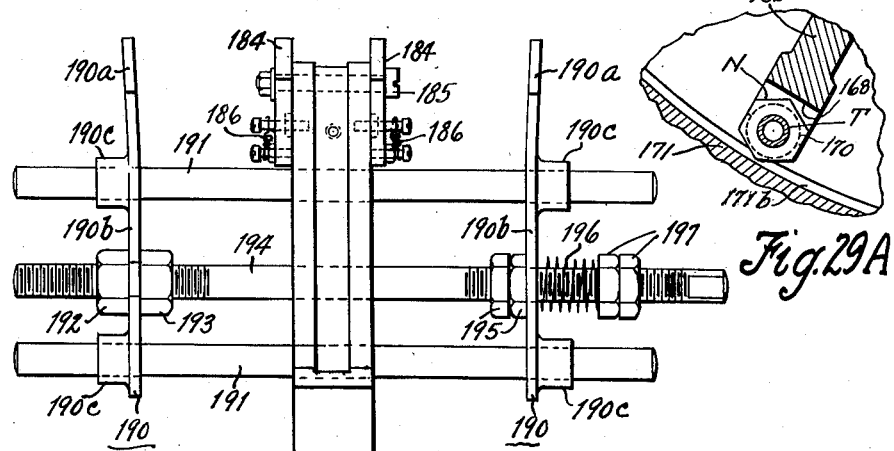
Fig. 31.
INVENTORS
Rea I. Hahn and Bernard E. Frank
BY Spencer Hardman & Fehr
their attorneys Patented Oct. 2, 1951

2,569,523

UNITED STATES PATENT OFFICE 2,569,523

TUBE FLARING MACHINE

Rea I. Hahn and Bernard E. Frank, Rochester, N. Y., assignors to General Motors Corporation, Detroit, Mich., a corporation of Delaware Application January 21, 1949, Serial No. 72,024

6 Claims. (Cl. 153—79)

This invention relates to the manufacture of tubing and its object is to provide a machine for flaring the ends of relatively short pieces of tubing which have been assembled with coupling nuts. To accomplish this object the disclosed embodiment of the present invention provides a rotary conveyor or dial which receives the piece of tubing with the nuts assembled thereon and moves it from the loading station to a work station where it is clamped between jaws and the ends of the tubing are simultaneously flared by two sets of oppositely moving punches which successively operate on the ends of the tubing. Between the successive operations, one pair of punches is moved into alignment with the tubing while the other pair is moved out of alignment.

The movements of the dial clamping jaws and punches are effected by hydraulic means which are so controlled that the various mechanisms operate in timed relation.

Further objects and advantages of the present invention will be apparent from the following description, reference being had to the accompanying drawings wherein a preferred embodiment of the present invention is clearly shown.

In the drawings:

Figs. 1 and 2 together constitute a front view of the upper part of the machine;

Fig. 7 is a fragmentary plan view in the direction of arrow 7 of Fig. 1;

Fig. 8 is a sectional view on line 8—8 of Fig. 7;

Fig. 9 is a view in the direction of arrow 9 of Fig. 8;

Fig. 10 is a sectional view on the line 10—10 of Fig. 7;

Fig. 13 is a front view of a lower clamping jaw spacer suitable for use with pieces of tubing longer than those for which the machine as shown in Fig. 3 is adapted;

Fig. 14 is a view in the direction of arrow 14 of Fig. 13;

Fig. 15 is a view in the direction of arrow 15 of Fig. 13;

Fig. 16 is a fragmentary sectional view on line 16—16 of Fig. 12 and shows an assembly, upper and lower, clamping jaws suitable for use with pieces of tubing longer than those for which the jaws as shown in Fig. 3 are adapted;

Figs. 17 and 18 are side and edge views respectively of part shown in Fig. 16;

Figs. 19 and 20 are side and edge views respectively of part shown in Fig. 16;

Figs. 21 and 22 are fragmentary sectional views showing respectively the first and second tube flaring operations;

Fig. 23 is an enlarged sectional view of a portion of Fig. 16;

Fig. 24 is a sectional view on line 24—24 of Fig. 23;

Fig. 25 is a view in the direction of arrow 25 of Fig. 3;

Fig. 26 is an enlarged sectional view on lines 26—26 of Figs. 25 and 27;

Fig. 27 is a sectional view on line 27—27 of Fig. 26;

Fig. 28 shows an assembly of tubing T and nuts N;

Figs. 28A, 29 and 29A are respectively fragmentary sectional views on lines 28A—28A of Fig. 29, 29—29 of Fig. 25 and 29A—29A of Fig. 28A;

Fig. 30 is a view in the direction of arrow 30 of Fig. 29;

Fig. 31 is a view in the direction of arrow 31 of Fig. 29;

Figure 1:
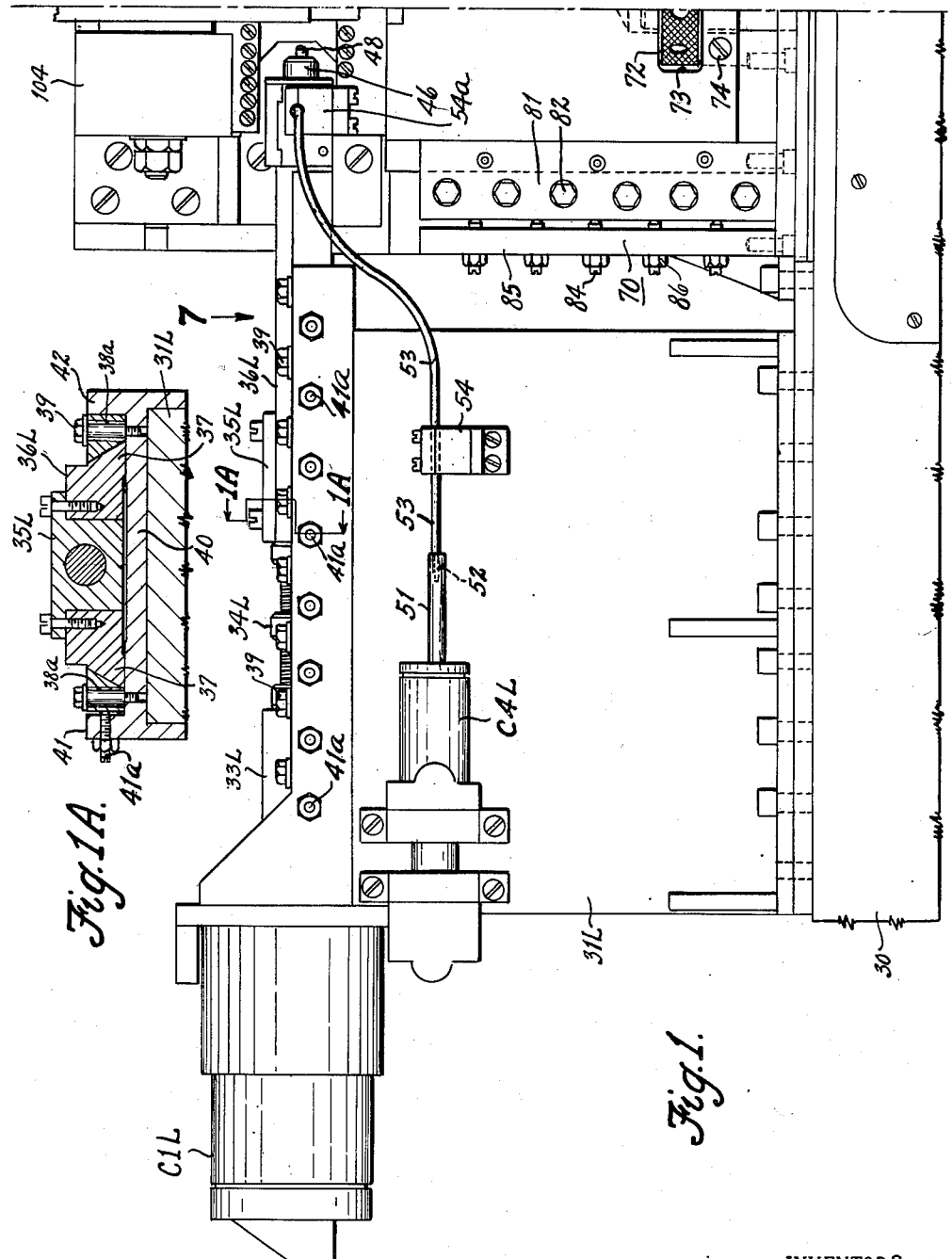
Fig. 1A is a sectional view on line 1A—1A of Fig. 1.
Figure 2:
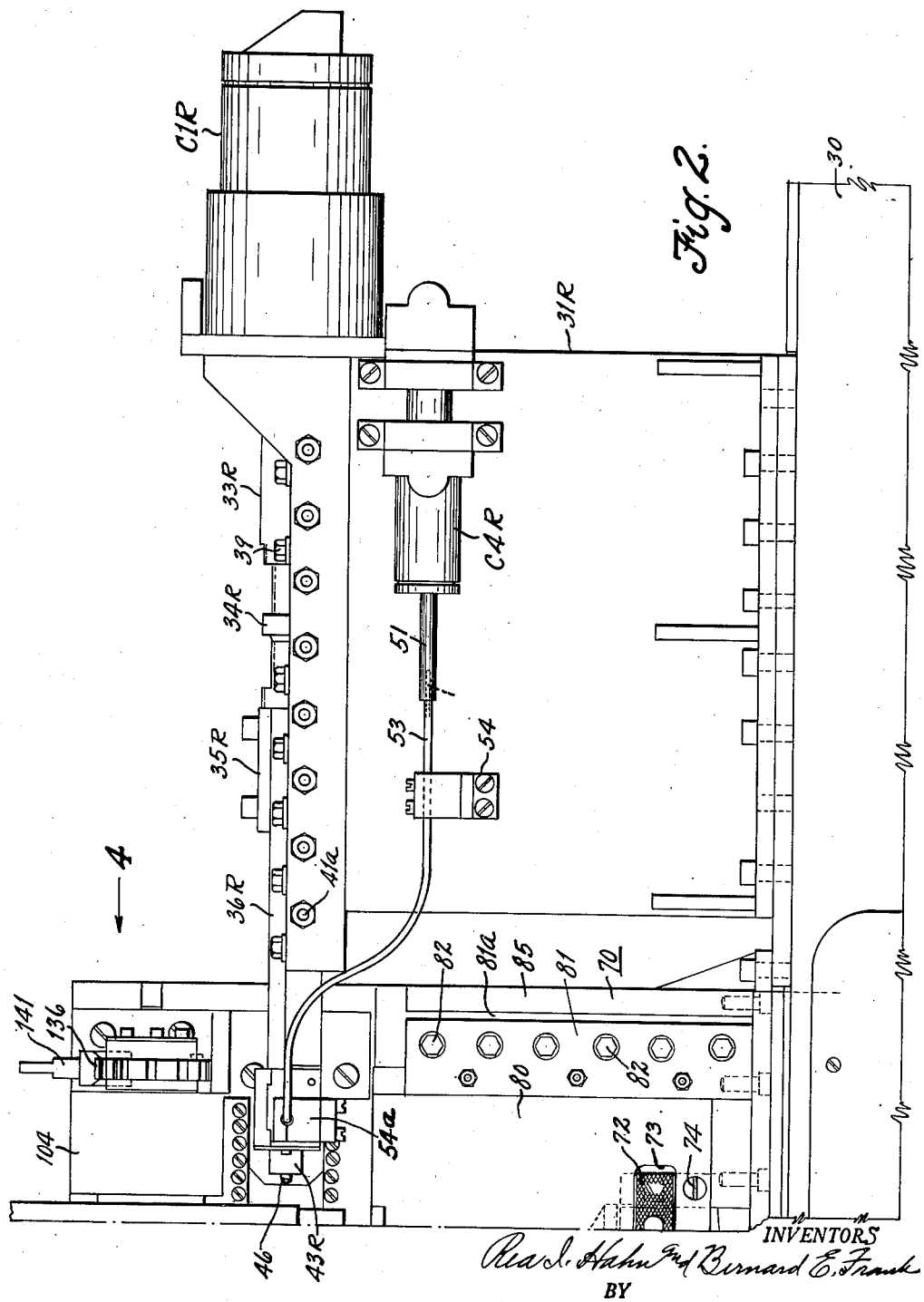
Figure 32:
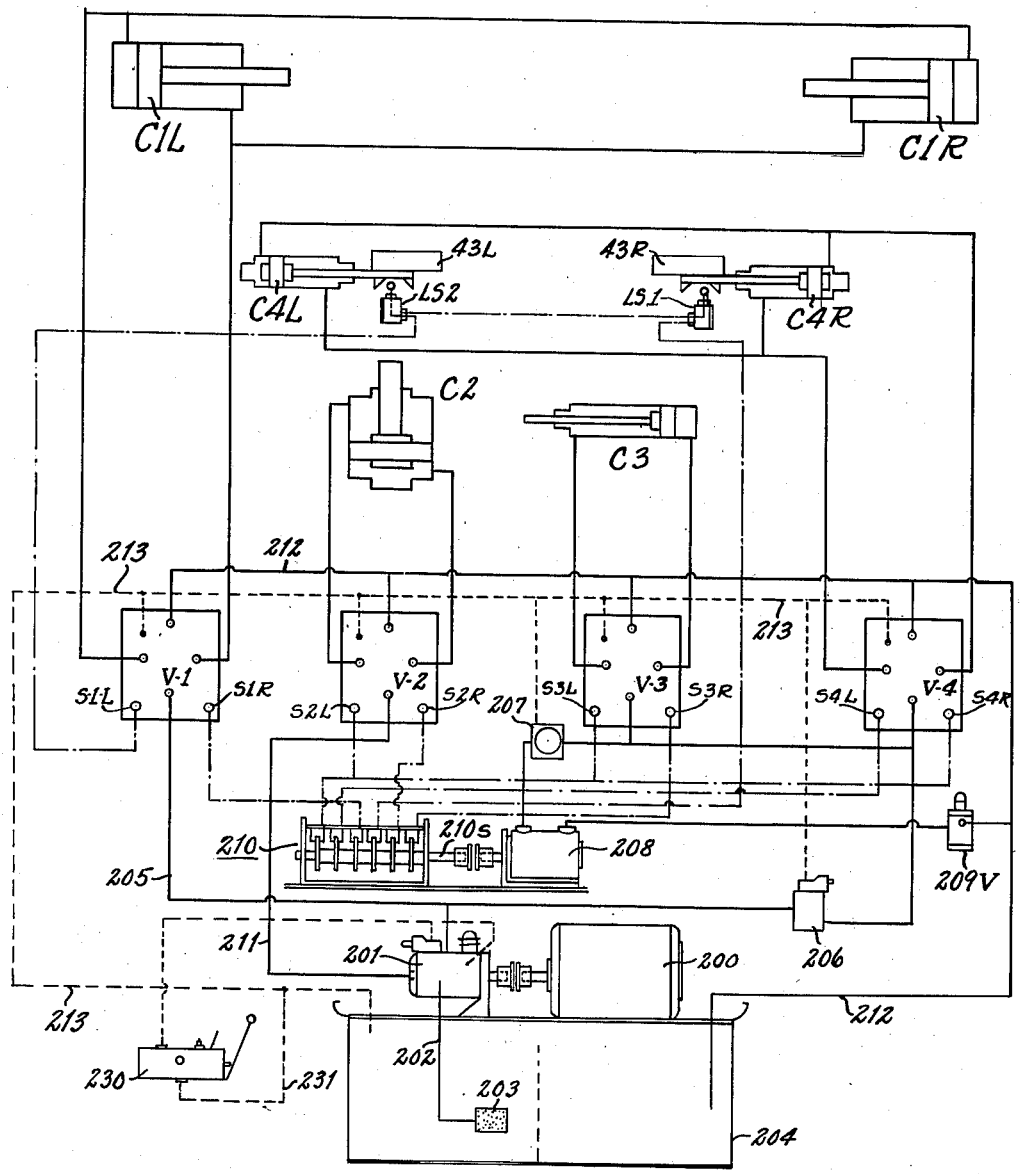
Fig. 32 is a diagram of the hydraulic circuits and part of the electrical circuits of the machine.

Referring to Figs. 1, 2, 3 and 4, the machine comprises a base 30 which provides a housing for the source of fluid pressure and parts of the control apparatus shown in Fig. 32. The base supports a frame 31L (Fig. 1) and a frame 31R (Fig. 2). These frames respectively support cylinders C1L and C1R containing pistons connected respectively by rods 32 with slides 33L and 33R which are connected respectively by screws 34L and 34R with blocks 35L and 35R which are attached to slides 36L and 36R respectively. The shanks of screws 34L and 34R are reversely threaded so that the turning of these screws adjust the distances between the slides 33L and 36L and between the slides 33R and 36R. These slides have dovetails 37 (Fig. 1A) which are guided by parallel gibs 38 (Fig. 7). Gibs 38 have slots 38a receiving screws 39 which fasten them to a plate 40 secured to frame 31L. Plate 40 has ribs 41 and 42. Adjustment of the gibs for wear can be effected by tightening screws 41a threaded through rib 41. A shim can be placed between rib 42 and right gib 38, if necessary. The slides 33R and 36R are guided in a similar manner.

Slide 36L supports a bar 43L which is retained by a plate 44L, Figs. 5, 7, 8 and 10, attached by screws 45 to this slide. Bar 43L is movable horizontally in a direction at right angles to the movement of the slide. Bar 43L carries holders 46 and 47 which respectively support punches 48 and 49. In order to locate one or the other of the punches in alignment with the tubing, the slide 43L is moved horizontally by a servomotor comprising a cylinder C4L whose piston rod 51 is connected with a Bowden wire 52 slidable through a tube 53 which a bracket 54 secures to the frame 31L. The tube 53 is also supported by the slide 36L. The wire 52 is attached to the bar 43L, as shown in Fig. 7. The bar 43L is connected by bars 55 and 56 with a rod 57 which is guided by bearings 58 provided by a bracket 59 and which supports a switch LS2 having an actuating rod 60 carrying a roller 61 engaged by either of the cams 62 and 63 which are supported by the rod 57. The right slide 36R (Fig. 5) carries a switch LS1 which is the counterpart of switch LS2 on the left side and switch LS1 is actuated in a similar manner by the right bar 43R (as indicated in Fig. 32) which in turn is actuated by the cylinder C4R (Fig. 2) which is operatively connected with the right bar 43R after the manner of connecting the left bar 43L with the cylinder C4L.

Figure 12:
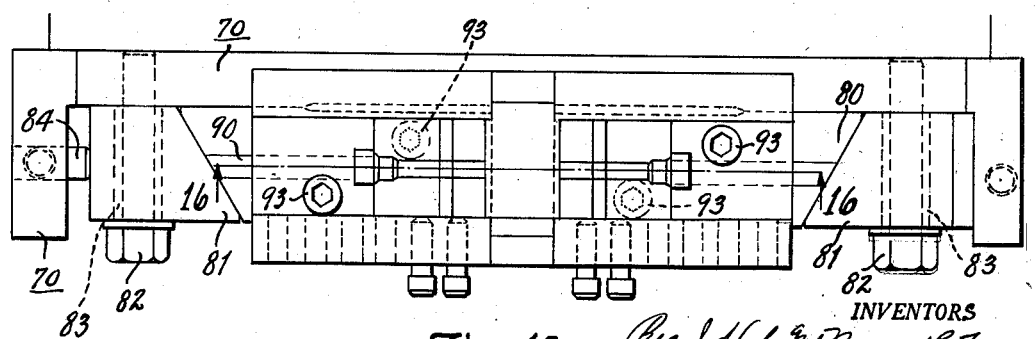
Fig. 12 is a view on the line 12—12 of Fig. 11.

Referring to Figs. 3-6, the base 30 supports a frame 70 located between the frames 31L and 31R. The frame 70 supports a cylinder C2 containing a piston connected with a rod 71 having a threaded portion engaged by a nut 72 received by recess 73 in a slide 80. By moving the nut 72 relative to the rod 71 the distance between the slide 80 and the piston can be varied. When the proper relative location has been obtained the nut 72 is secured in adjusted position by tightening of the screws 74 (Fig. 5A) threaded through the slide 80 and engageable with vertically movable pins 75 which are wedged against the underside of nut 72. The slide 80 is guided by gib 81 retained by screws 82 passing through slots 83 in the gib (Fig. 12). The connection between the slide and piston rod provides for a slight movement of the gib in a horizontal direction in order to locate the slide centrally of the machine. This central location is obtained by adjusting the left gib 81 laterally by means of the screws 84 which are threaded through the left flange 85 of the frame 70 and locked in adjusted position by the nut 86. This adjustment forces slide 80 and right gib 81 against a shim 81a and the latter against right flange 85 of frame 70. After the gibs have been properly located the screws 82 are tightened.

Figure 3:
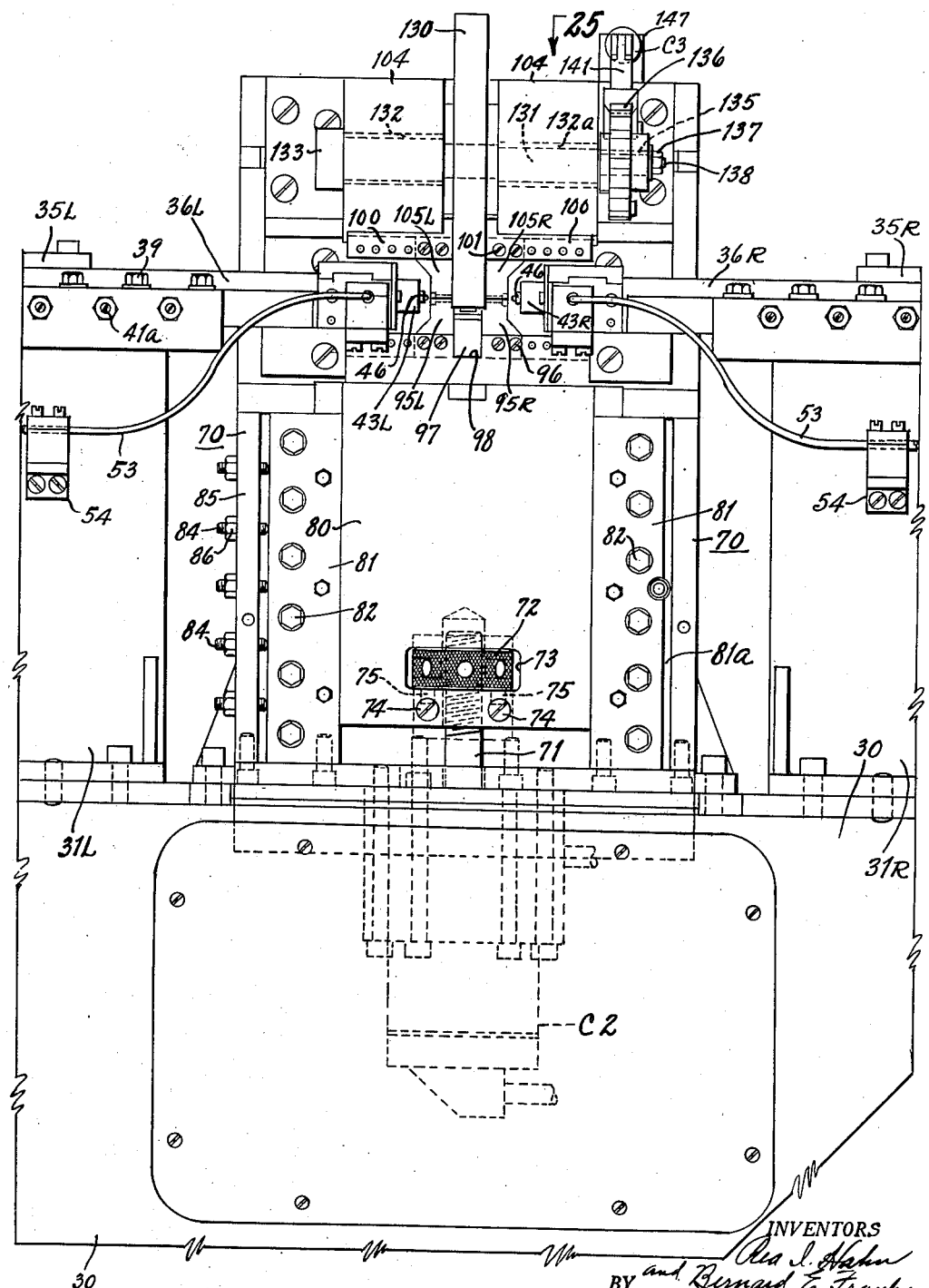
Fig. 3 is a front view of the middle part of the machine and is viewed in the direction of arrow 3 of Fig. 4.
Figure 4:
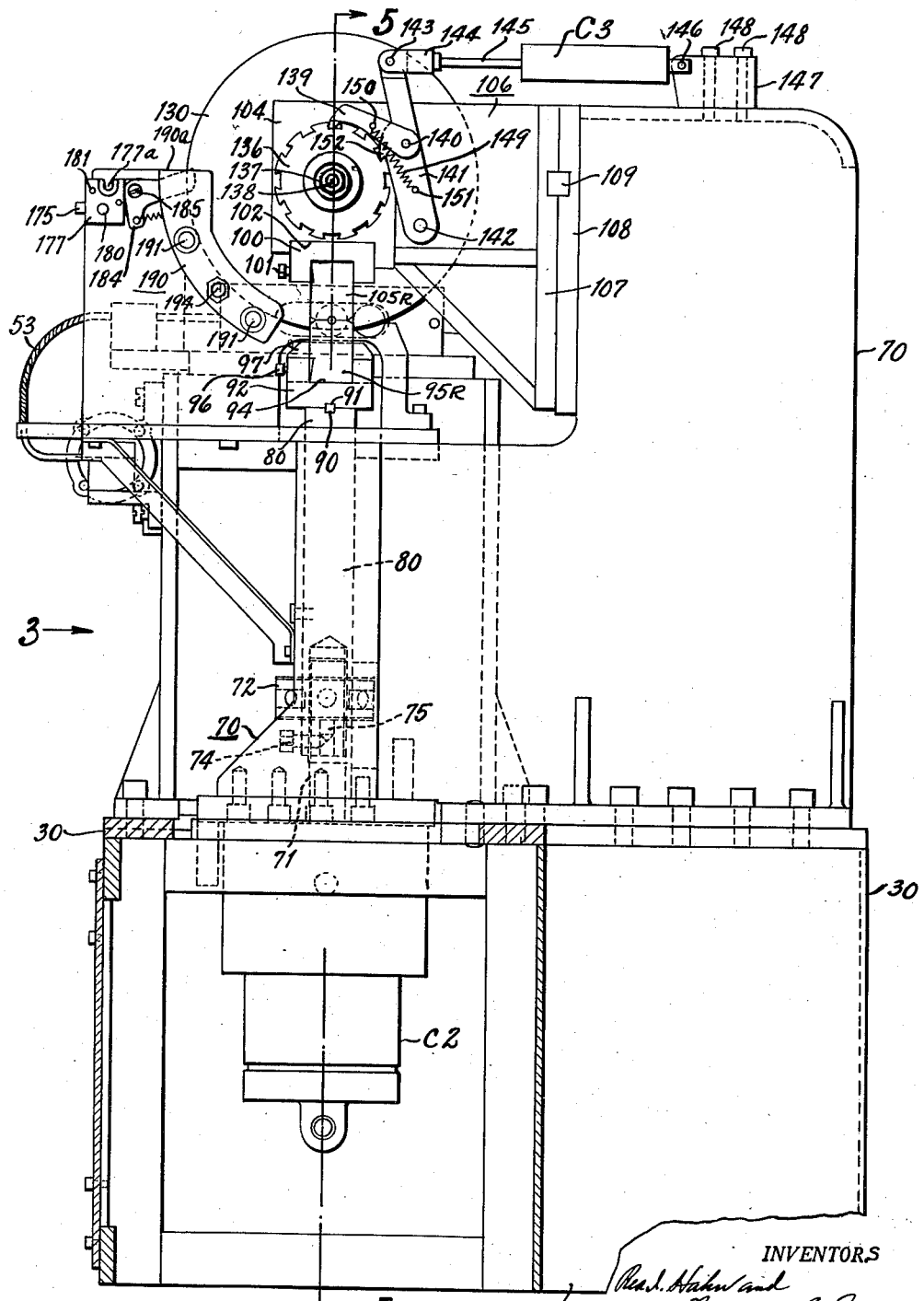
Fig. 4 is a view in the direction of arrow 4 of Fig. 2.
Figures 5, 5A:
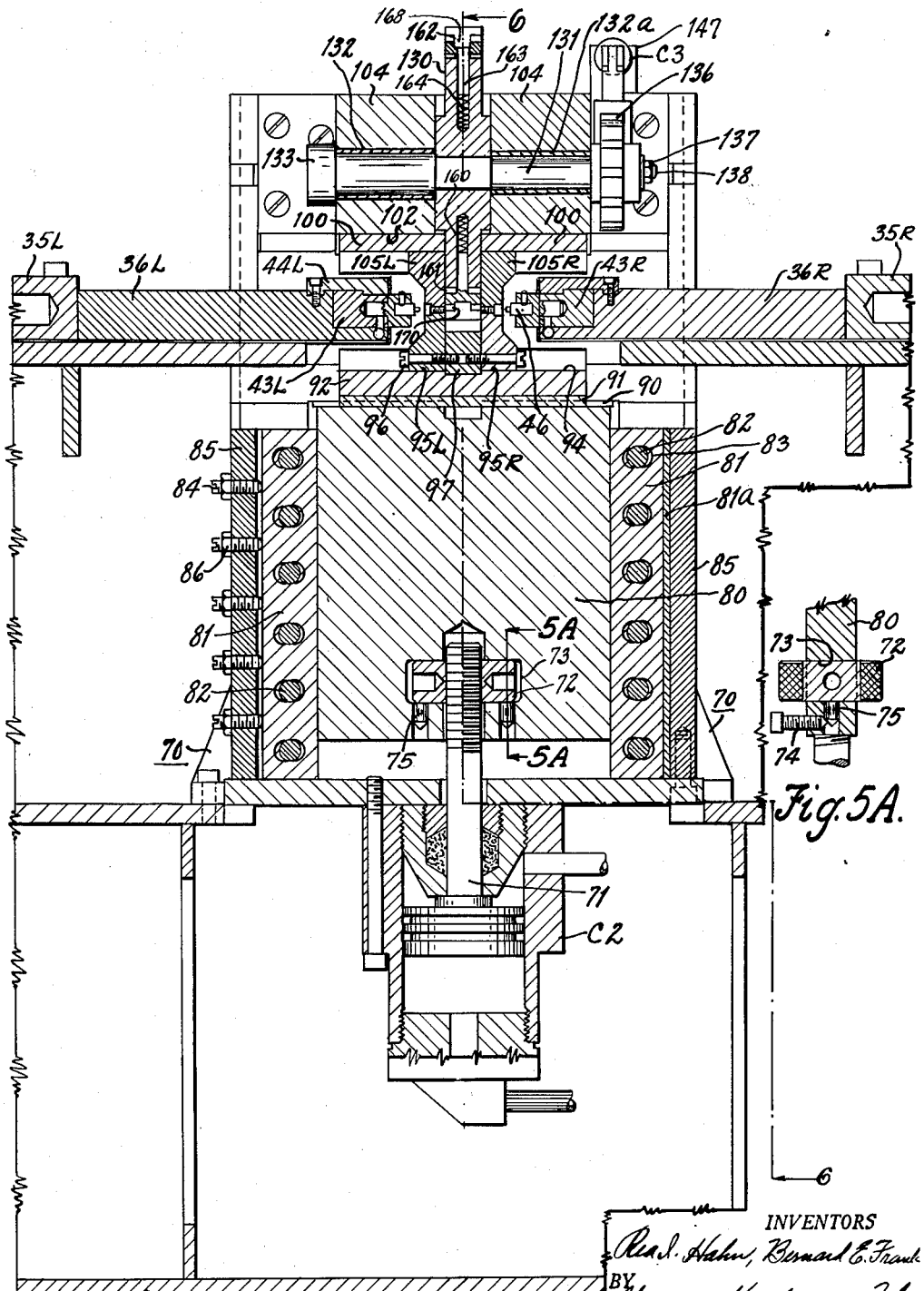
Fig. 5 is a sectional view on the line 5—5 of Fig. 4.
Fig. 5A is a sectional view on line 5A—5A of Fig. 5.
Figure 11:
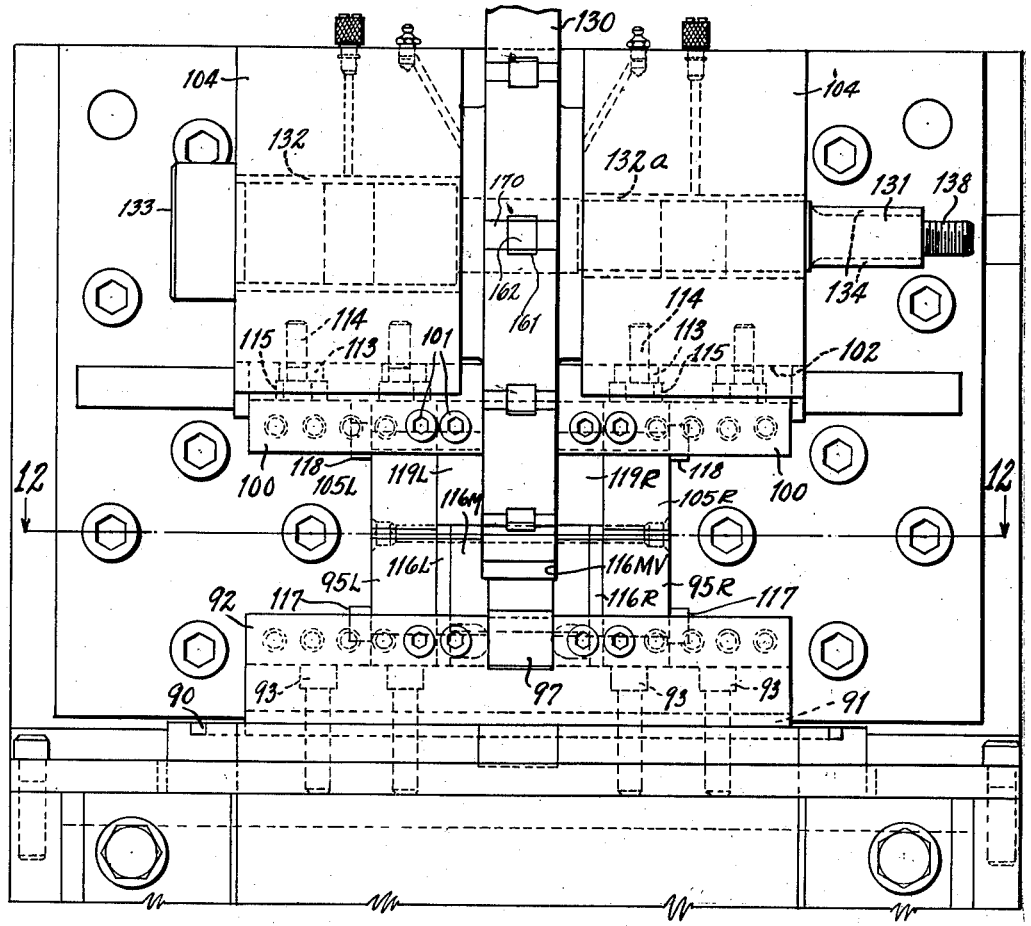
Fig. 11 shows an arrangement of dies for operating upon a length of tubing which would be longer than that which would be accommodated by the die shown in Fig. 3.

As shown in Figs. 4, 5, 11 and 12, the upper end of slide 80 has a slot 90 which receives a key 91 received also by a slot in a holder 92 which is secured to the slide 80 by screw 93 and which provides a grove 94 for receiving clamping jaws 95L and 95R (Fig. 5) which are secured in the desired position by clamping screws 96. The jaws 95L and 95R are spaced apart by spacer 97 (Fig. 3) received by notches 98 provided by the holder 92. The spacer 97 spaces the clamps 95L and 95R correctly so that the dial 130 may be received between them. Clamping jaws 95L and 95R cooperate respectively with the upper clamping jaws 105L and 105R (Fig. 3) which are received by holders 100 and which are clamped thereinto by screws 101 in such position that the dial 130 closely fits between them. The holders 100 are received by grooves 102 provided by shaft bearing blocks 104 which, as shown in Fig. 25, are integral parts of a bracket 106 having an integral mounting plate 107 which is supported by a pad 108 of bracket 70 by means of a key 109 received by a horizontal groove in parts 107 and 108 which are secured together by screws 110 and 111, dowels 112 being provided for accurate location of these parts. Adjustment of the holder 102 relative to the bracket parts 104 is obtained by providing the holders with elongated holes 113 (Fig. 11) for receiving the attaching screws 114 which are threaded into the parts 104, said screws having their heads received by elongated counterbores 115 of the holders. If the machine is set up, as shown in Figs. 3 and 5, to operate only on the shortest pieces of tubing only the spacer 97 is located between the jaws 95L and 95R. To adapt the machine as shown in Fig. 11, for operation upon longer pieces of tubing spacers 116L, 116R (Figs. 17, 18) and 116M (Figs. 13-15) are used between the jaws 95L and 95R which are secured to these spacers by screws 117 (Fig. 16). The upper jaws 105L and 105R are attached by screws 118 to spacers 119L and 119R and these jaws and spacers are secured to the holder 100 by the screws 101.

The pairs of jaws, for example 95L, 105L (Fig. 23) when closed provide a socket or die having cylindrical surface 120 merging with the frusto-conical surface 121 and 122, the latter merging into a cylindrical surface 123 which joins a threaded portion 124, the tops of the threads having been ground away on the radii 125 (Fig. 24).

The dial 130 which is received directly between the pair of jaws 95L, 105L and 95R, 105R (Fig. 3) or between the spacers 119L and 119R and the vertical parts 116MV of spacer 116M (Fig. 11) is supported by and fixed to a shaft 131 journaled in bearings 132 and 132a (Fig. 3) supported by the bracket parts 104 (Fig. 11). Shaft 131 has a head 133 which bears against the left side of bracket 104 and the right end of the shaft has key grooves 134 for receiving a key 135 by which a connection is made between the shaft 131 and a ratchet 136 (Fig. 4) which is retained by a nut 137 engaging the threaded portion 138 of the shaft. Ratchet 136 is engaged by a pawl 139 pivoted on a pin 140 carried by a lever 141 pivoted on a pin 142 supported by the bracket 106. Lever 141 carries a pin 143 connected by a clevis 144 with a rod 145 of a piston within a cylinder C3 pivoted by pin 146 on a bracket 147 which screw 148 attaches to the frame 70. A spring 149 connected with a stud 150 of pawl 139 and a stud 151 on lever 141 urges the pawl toward the ratchet. It is apparent that right movement of rod 145 will back the pawl 139 from the ratchet and allow it to engage a tooth to the right of the one engaged by the pawl as shown in Fig. 4, and the left movement of rod 145 will cause the ratchet to be rotated counterclockwise the angular distance of the spacing of the ratchet tooth, said distance being determined by the engagement of a projection 152 of lever 141 with the upper side of a ratchet tooth. Due to friction the dial 130 does not rotate clockwise while the lever 141 is so rotated.

The dial 130 is provided with equidistant radially extending holes 160 (Figs. 6 and 29) each connected with a radially exposed rectangular notch 161 which receives a rectangular head 162 of a rod 163 received by the hole 160 and urged outwardly by a spring 164 so that the rod is normally located at 163' (right side of Fig. 29) further outward movement of the rod being limited by the engagement of a pin 166 with the end of notch 167 of the rod. The head 162 of rod 163 has two cylindrical surfaces 170 for receiving the threaded portions of nuts N and each rod head, as shown in Fig. 28A, is provided with a groove 168 of sufficient width to receive the hexagonal portions of nuts N which are assembled with the tubing T.

The dial 130 rotates in close proximity to the cylindrical surfaces 171a and 172a of plates 171 and 172 respectively which are attached to a plate 174 supported by the frame 70. These cylindrical surfaces are grooved at 171b and 172b (Fig. 30) to receive the hexagonal portions of nuts N as shown in Fig. 29A. The groove 171b flares out at 171c. A screw 175 attaches to the plate 171 a workholder comprising a block 176, side plates 177 and 178 and a partition plate 179 secured together by screws 180 and dowels 181. Nuts N which are to form the loose assembly of nuts and tubing shown in Fig. 28, are so located in the workholder that notches 176a receive the threaded portion and notches 176b of block 176 receive the hexagonal portions. The partition 179 spaces the nuts. The tubing T is passed through the flared notch 177a, in plate 177, then through the right nut N, through the notch 179a in partition 179, through the left nut N and through the notch 178a in part 178.

The loose assembly of the tubing T and the nuts N is moved horizontally to the right in Fig. 29 along the upper surface of plate 171. The nuts are engaged by surfaces 171c which cam the nuts together so as to be received by grooves 171b and 172b. As the tubing moves, it cams downwardly two levers 184 pivoted on screw 185 and urged counterclockwise by spring 186. The tubing is moved far enough to clear the right ends of lever 184 and, therefore, to move the rod head 162 inwardly so that the nuts N will be located between the cylindrical surfaces 170 of the rod head and the right end of lever 184, the tubing being pushed far enough by the operator to permit the levers 184 to be returned by spring 186 to normal position, thereby retaining the nuts N in engagement with the rod head 162. Thereafter during counterclockwise motion of the dial 130, the tubing moves with the dial with the nuts assembled thereon from the loading position down to the work position where at the proper time the jaws engage the tubing and lift it and the nuts away from the cylindrical surfaces 171a and 172a of plates 171 and 172. While the tubing is thus gripped by the jaws, its ends are operated upon by the punches 48 and 49 as shown in Figs. 21 and 22. After the flaring operations have been performed, the lower jaw descends below the cylindrical surfaces 171a and 172a and the spring 164 is permitted to act through the rod 162 to push the nuts against the cylindrical surface 172a. Therefore, when the tubing has been moved to the right away from the surface 172a, spring 164 is permitted to move the rod to position 163' (Fig. 29) so that the assembly of nuts and tubing is free to gravitate from the dial.

In order that the ends of the tubing will extend equidistant from the sides of dial 130 when movement of the assembly of tubing and nuts by the dial begins, the tubing is guided to the dial by the plates 190 having horizontal portions 190a flaring outwardly from arcuate portions 190b which are maintained in parallelism and in alignment by providing the plates with flanges 190c which are supported by rods 191 which are affixed to plate 171. The correct spacing of plates 190 is fixed by the adjustment of nuts 192 and 193 threaded on a rod 194 affixed to plate 171 and passing through the arcuate portions 190b of the plates and by adjusting nuts 195, against which the right plate 190 bears under the action of a spring 196 retained by nuts 197.

Referring to Fig. 32, a motor 200 drives a pump 201 having an inlet pipe 202 connected through a screen or filter 203 with oil in the tank 204. Pump 201 is connected by an outlet pipe 205 with valve V1 and through a reducing valve 206 with valves V4 and V3 and through a flow control valve 207 with a hydraulic motor 208, which drives a timer 210. Pump 201 is connected by pipe 211 with valve V2. Valve V1 controls the distribution of the pressure fluid to cylinders C1R and C1L; valve V2 controls the distribution of pressure fluid to clamping cylinder C2; valve V3 controls the distribution of pressure fluid to index cylinder C3; valve V4 controls the distribution of pressure fluid to cylinders C4L and C4R, respectively, which operate, respectively, the punch carrying slides 43L and 43R. Each of the valves V1, V2, V3 and V4 has a movable part which has two positions. In one position of the movable part, the pressure source is connected with one end of the cylinder while the other end of the cylinder is connected with a drain pipe 212 which returns the exhaust oil to tank 204. When each movable valve part is in the other position, the connections are reversed so that the cylinder end, which had been connected with the pressure cylinder, becomes connected with drain pipe 212, while the cylinder end which had been connected with the drain pipe becomes connected with the pressure source. The drain pipe 213 represented by dash lines returns to the tank 204 any oil leaking past movable valve parts of valves V1, V2, V3 and V4, and valves 206 and 207.

Each of the valves V1, V2, V3 and V4 is controlled by solenoids which, when energized, causes movable valve parts to move in different directions. For example, valve V1 has a solenoid S1L which, when energized, shows conditioned valve V1 that pressure fluid is admitted to the left and right ends of the cylinder C1L and C1R to advance the punches. When solenoid S1R is energized, valve V1 reverses its connection so that pressure fluid is respectively to the right of C1L and C1R to retract the punches. The solenoids of valve V2 are represented by S2L and S2R; the solenoids of valve V3 are represented by S3L and S3R; while the solenoids of valve V4 are marked S4L and S4R.

Figure 33:
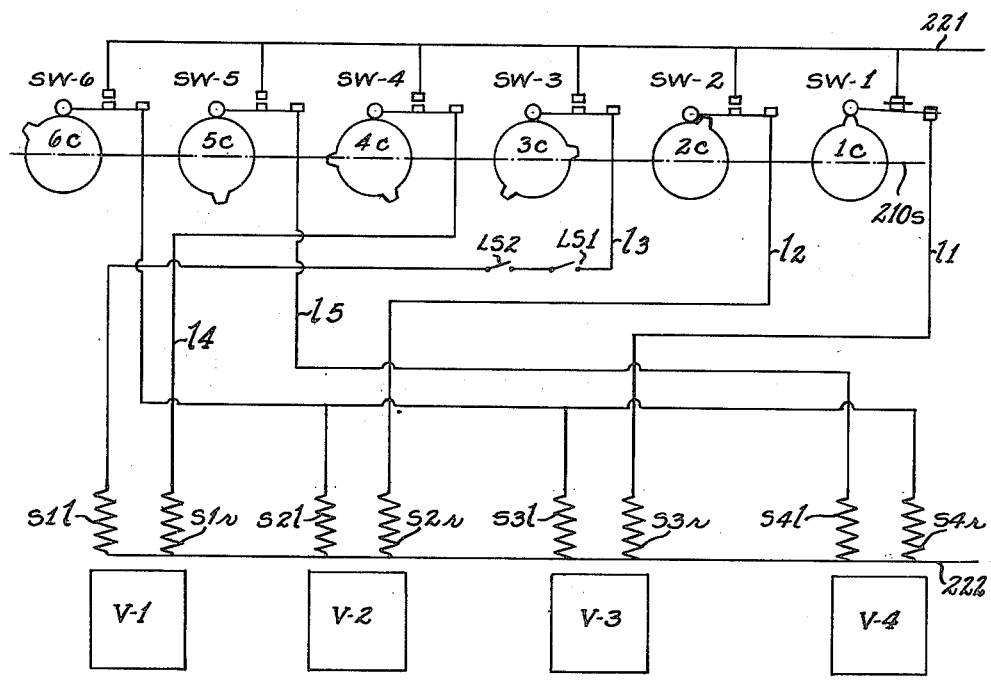
Fig. 33 is a more complete wiring diagram of the electrical circuits.

The dot and dash line of Fig. 32 represents electrical circuits which can best be understood by reference to Fig. 33. The timer 210 includes a shaft 210s driven by a motor 208 which rotates counterclockwise. Cams 1c, 2c, 3c, 4c, 5c and 6c which control respectively, switches SW1, SW2, SW3, SW4, SW5 and SW6. The stationary contacts of the switches are connected with wire 22l and one end of each of the solenoids is connected with wire 222. Wires 221 and 222 are connected with a current source of suitable voltage, for example, 110 volts A. C. The movable contacts of the switches SW1, SW2, SW3, SW4 and SW5 are connected respectively by wires 11, 12, 13, 14 and 15 with solenoids S3R and S2R, S1L, S1R and S4L. Wire 13 is in series with limit switches LS1 and LS2, which are closed only when slides 43r and 43l are in positions which align one or the other of the punches with the work. The movable contact of the switch SW6 is connected with solenoids S2l, S3l and S4r.

Figure 6:
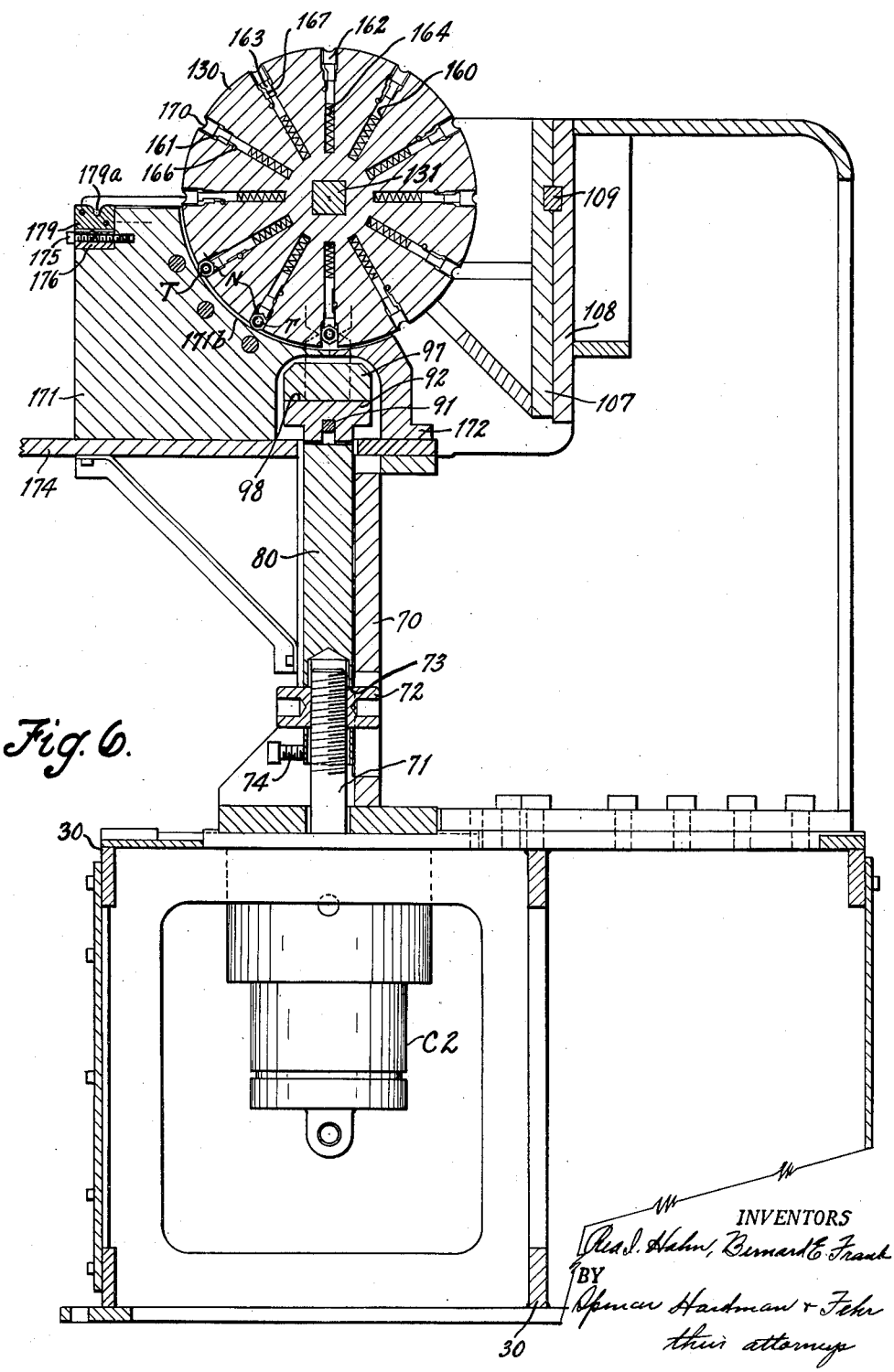
Fig. 6 is a sectional view on line 6—6 of Fig. 5.
Figure 34:
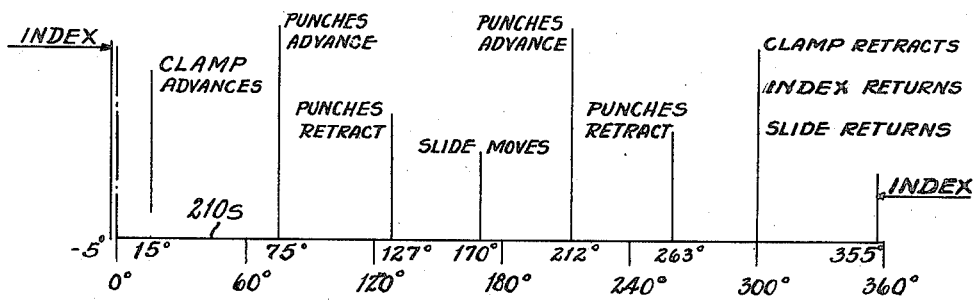
Fig. 34 is a timing chart.

During one revolution of shaft 210s, represented by horizontal line (Fig. 34) from zero to 360°, the following events take place. At zero a cam 1C closes switch SW1 thereby causing solenoid S3r to be energized which conditions valve V3 while the pressure fluid is admitted to the right end of C3 (Fig. 32) which also causes indexing. At 15° shaft revolution, cam 2C closes switch SW2 which causes solenoid S2r to be energized and it conditions valve V2 so that pressure fluid is admitted to the lower end of cylinder C2 (Fig. 32) and the tubing is clamped. At 75° cam 3C closes switch SW3 thereby causing solenoid S1l to be energized and it conditions valve V1 for admission of said pressure fluid to the left and right ends respectively of the cylinders C1L and C1R thereby causing the punches to advance toward the work to form the tubing ends as shown in Fig. 6. At 120° cam 4C closes switch SW4 which causes energization of solenoid S1r which conditions valve V1 for the admission of pressure fluid in the right and left ends respectively of cylinders C1L and C1R which cause the punches to be retracted. At 170° cam 5C closes switch SW5 thereby causing solenoid S4l to be energized and thereby conditioning valve V4 for admission of pressure fluid into the left and right ends respectively of cylinders C4L and C4R, thereby effecting movement of the punches carrying slides 43l and 43r respectively in order to shift the punches shown in Fig. 7 into alignment with the work. At 212° a second lobe of cam 3C closes switches SW3 to effect the advancing of the punches and at 263° the second lobe of cam 4C closes switch SW4 to effect retraction of the punches. At 300° cam 6C closes switch SW6 which effects energization of the solenoids S2l and S3l and S4r which causes valves V2, V3 and V4 respectively to be conditioned for retracting the clamp and the index pawl and returning the punch-carrying slides to their first position. At 355° indexing begins and the cycle continues as before. The cycle can be stopped by stopping motor 200 or by opening valve 230 which connects the pump outlet with a by-pass 231 to the tank.

Hydraulic motor 208 is connected to drain 212 through a valve 209 V which prevents discharge from valves V1, V2, V3, V4 interfering with discharge from motor 208.

While the embodiment of the present invention as herein disclosed, constitutes a preferred form, it is to be understood that other forms might be adopted.

What is claimed is as follows:

1. A machine for flaring the ends of pieces of tubing comprising clamping jaws which grip the tubing between its ends and which provide flaring dies receiving the end portions of the tubing, a pair of punches adapted to cooperate with the dies when the tubing is gripped by said jaws for performing a first flaring operation, a pair of punches adapted to cooperate with the dies when the tubing is gripped by said jaws for performing a second flaring operation, two punch supports located respectively adjacent the ends of the tubing, each supporting a punch of the first pair and a punch of the second pair parallel to the tubing, means for moving the supports laterally of the tubing to locate the first pair of punches and the second pair of punches successively in alignment with the tubing and means for moving the supports axially of the tubing, a conveyor adapted to support a plurality of pieces of tubing and movable to bring said pieces of tubing successively into position to be gripped by said jaws, means for moving the jaws to grip said tubing while it is supported on said conveyor, means for holding the conveyor against movement while the tube is gripped by said jaws and means for removing the tubing from the conveyor after the flaring operation is completed.

2. A machine for flaring the ends of pieces of tubing on which two coupling nuts are loosely assembled comprising two spaced pair of clamping jaws which grip the tubing between its ends and which provide flaring dies for receiving the end portions of the tubing, punches cooperating with the dies to perform flaring operations, means for effecting relative movement of the jaws, means for operating the punches, a dial movable between the pairs of jaws and having recesses each for coupling nuts which support the tubing, means for indexing the dial, and means for retaining the nuts in the recesses of the dial as it moves them with the tubing supported thereby from a loading station to the flaring station.

3. A machine according to claim 2 in which the dial carries radially movable rods each having a head which engages the nuts received by a dial recess, in which each rod is urged by a spring against the nuts, and in which a fixed arcuate plate located adjacent the dial is engaged by the nuts as the dial moves them with the tubing supported thereby from a loading station to the flaring station.

4. A machine according to claim 2 in which the dial carries radially movable rods each having a head which engages the nuts received by a dial recess, in which each rod is urged by a spring against the nuts, in which means are provided at the dial loading station for latching the nuts in the nut receiving recess of the dial, and in which a fixed arcuate plate located adjacent the dial is engaged by the nuts as the dial moves them with the tubing supported thereby from a loading station to the flaring station.

5. A machine according to claim 2 in which the dial carries radially movable rods each having a head which engages the nuts received by a dial recess, in which each rod is urged by a spring against the nuts, in which there is a workholder having pockets for receiving the coupling nuts while the tubing is passed through them and having means for guiding the nuts into the dial recess at the loading station and having a latch engageable with the tubing for retaining the nuts in the dial recess at the loading station, and in which a fixed arcuate plate located adjacent the dial is engaged by the nuts as the dial moves them with the tubing supported thereby from a loading station to the flaring station.

6. A machine according to claim 2 in which the dial carries radially movable rods each having a head which engages the nuts received by a dial recess, in which each rod is urged by a spring against the nuts, in which there is a workholder having pockets for receiving the coupling nuts while the tubing is passed through them and having means for guiding the nuts into the dial recess at the loading station, in which there are spaced plates engageable with the ends of the tubing as it is moved with the nuts to the dial for locating the tubing in proper relation to the nuts, and in which a fixed arcuate plate located adjacent the dial is engaged by the nuts as the dial moves them with the tubing supported thereby from a loading station to the flaring station.

REA I. HAHN.
BERNARD E. FRANK.

REFERENCES CITED

The following references are of record in the file of this patent:

UNITED STATES PATENTS

| Number | Name | Date |
| --- | --- | --- |
| 666,905 | Packer | Jan. 29, 1901 |
| 1,605,535 | Foisy | Nov. 2, 1926 |
| 1,703,527 | Henshall | Feb. 26, 1929 |
| 1,805,124 | Wilcox | May 12, 1931 |
| 1,894,526 | Wilcox | Jan. 17, 1933 |
| 1,972,293 | Ellison | Sept. 4, 1934 |
| 2,176,188 | Poole | Oct. 17, 1939 |
| 2,375,763 | Blais | May 15, 1945 |

FOREIGN PATENTS

| Number | Country | Date |
| --- | --- | --- |
| 121,705 | Great Britain | Jan. 2, 1919 |
| 519,399 | Great Britain | Mar. 26, 1940 |
| 779,170 | France | Jan. 10, 1935 |